Figure 1:
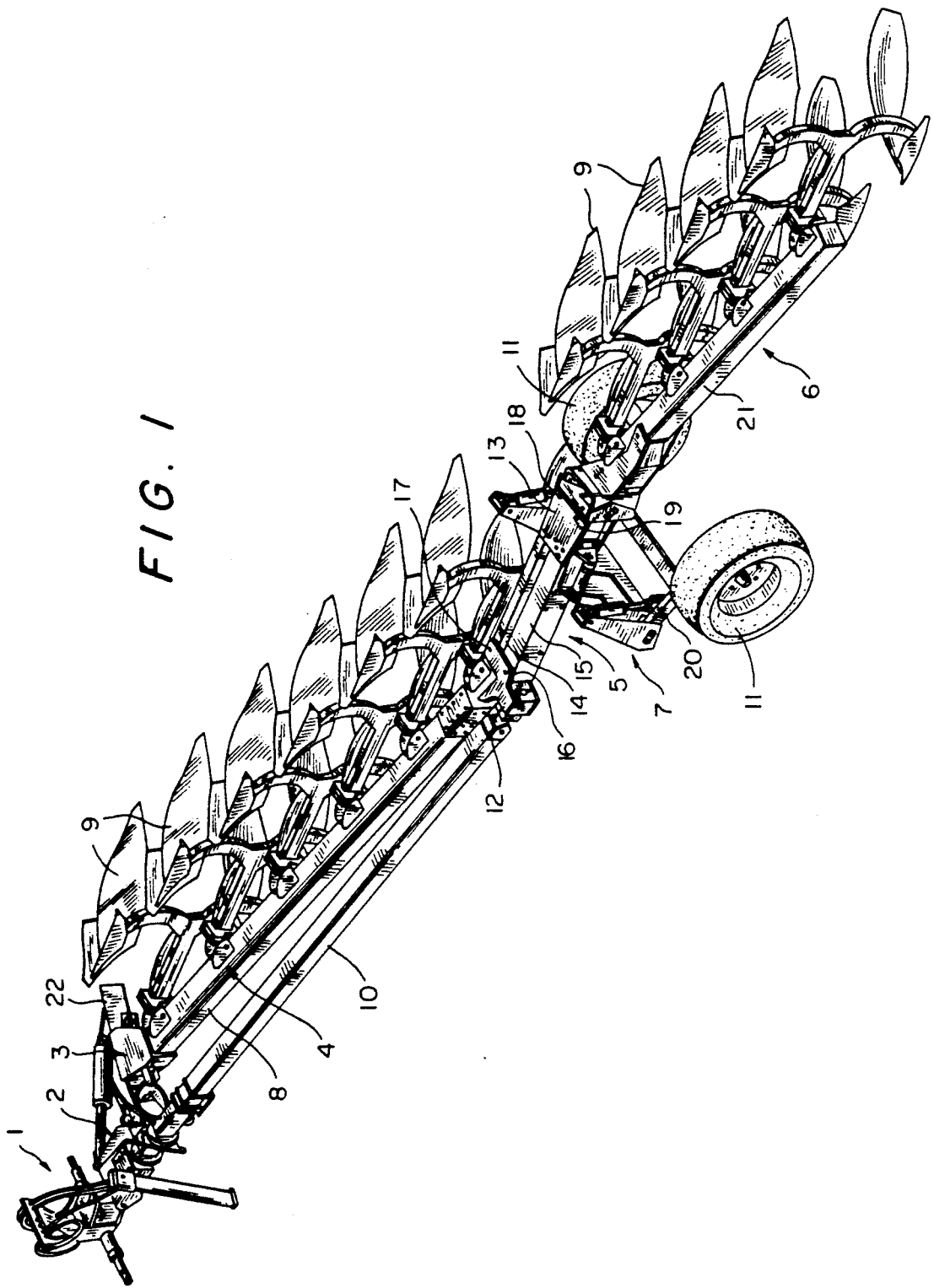

United States Patent [19]
Mong

[11] Patent Number: 5,314,028
[45] Date of Patent: May 24, 1994

[54] ADJUSTING DEVICES FOR A SEMI-MOUNTED PLOUGH

[75] Inventor: Øivind Mong, Kleppe, Norway

[73] Assignee: Kverneland Klepp AS, Kvernaland, Norway

[21] Appl. No.: 1,525

[22] Filed: Jan. 6, 1993

[30] Foreign Application Priority Data

Jan. 23, 1992 [GB] United Kingdom ............... 9201485

[51] Int. Cl.⁵ .......................... A01B 49/00; A01B 3/28
[52] U.S. Cl. ...................................... 172/219; 172/314
[58] Field of Search .............. 172/219, 204, 223, 221, 172/224, 225, 232, 314, 310, 324, 467, 476, 477, 640, 645, 646, 648, 649; 280/467, 456, 459

[56] References Cited

U.S. PATENT DOCUMENTS

| | | | |
|---|---|---|---|
| 3,305,025 | 2/1967 | Johnson et al. | 172/218 |
| 3,604,516 | 9/1971 | Maxwell | 172/225 |
| 3,965,989 | 6/1976 | Ward | 172/314 |
| 4,036,306 | 7/1977 | Kinzenbaw | 172/287 |
| 4,119,156 | 10/1978 | Wheeler et al. | |
| 4,121,852 | 10/1978 | Quanbeck | 172/314 |
| 4,301,872 | 11/1981 | Hastings et al. | 172/314 |
| 4,896,731 | 1/1990 | Besson | 172/225 |
| 5,199,503 | 4/9193 | Matsepuro et al. | 172/221 |

FOREIGN PATENT DOCUMENTS

| | | |
|---|---|---|
| 297969 | 1/1989 | European Pat. Off. |
| 2641956 | 4/1977 | Fed. Rep. of Germany |
| 9205779 | 8/1992 | Fed. Rep. of Germany |
| 2310686 | 10/1976 | France |
| 2623686 | 6/1989 | France |
| 2662567 | 6/1991 | France |
| 2664124 | 10/1992 | France |

Primary Examiner—Randolph A. Reese
Assistant Examiner—Spencer K. Warnick
Attorney, Agent, or Firm—Foley & Lardner

[57] ABSTRACT

The invention relates to an adjusting arrangement in a semi-mounted, preferentially reversible plough, comprising an elongate plough frame (4-6) carrying a plurality of plough bodies (9) and being supported on wheels (11). The elongated plough frame (4-6) comprises: an interconnected front main plough frame (4), rear main plough frame (6) as well as intermediate frame section (5). The front and rear main plough frames (4, 6) each carry plough bodies (9). The front end (at 3) of the front main plough frame (4) is laterally adjustable for adaption to one of a plurality of mutually differing ploughing widths, and each single plough body (9) is correspondingly adjustable. The technical effect sought to be achieved by the invention consists in automatically ensuring correct lateral spacing between adjacent plough bodies for all ploughing widths as soon as the spacings have been set and being equal for one adjusted ploughing width. According to the invention, this is realized in that the intermediate frame section (5) constitutes a parallelogram (12–19), adjustable to and lockable in different angular positions in relation to the mutually parallel longitudinal axes of the front and rear main plough frames (4, 6).

5 Claims, 2 Drawing Sheets

ADJUSTING DEVICES FOR A SEMI-MOUNTED PLOUGH

This invention relates to a semi-mountable plough and particularly, though not exclusively, of the reversible type.

With the largest semi-mounted reversible ploughs, it is advantageous to have wheels positioned just rearward of the central point of the plough frame with regard to the longitudinal dimensions of the plough. These "intermediate" wheels lift the plough up from the ground and also provide a means by which the plough may be transported. This wheel arrangement gives the plough improved balance as well as facilitating its operation.

When the wheels are in the intermediate position with respect to the longitudinal dimensions of the plough frame, a special frame section for the attachment of the wheels, has to be arranged between and interconnected to a front main plough frame and a rear main plough frame. Both the intermediate frame section and the wheels require some space extending in the longitudinal direction of the entire plough frame. This results in a displacement between the front plough frame and rear plough frame that is larger than the mutual distance between adjacent plough bodies.

This would not present a problem if the plough was used for only one ploughing width because the lateral distance or ploughing width could have been made equal for all plough bodies. However, when a plough has to be fully adjustable, it becomes difficult to make the lateral distance (the ploughing width) between the rearmost plough body of the front main plough frame and the foremost plough body of the rear main plough frame equal to the spacing between each pair of adjacent plough bodies of the remainder.

Therefore, when using a set of intermediate wheels, there is a problem associated with ensuring that the lateral distance between each pair of adjacent plough bodies becomes equal when the plough is adjusted to any number of differing ploughing widths.

According to one known technique, the intermediate frame section which carries the wheels, is substituted by a new one every time the ploughing width of the plough is changed. This solution is expensive, laborious and extremely time-consuming.

The object of the present invention is to eliminate or substantially reduce these deficiencies and disadvantages, and provide a device for a semi-mounted reversible plough in which the equal spacing between all adjacent plough bodies is maintained for all possible or desired ploughing widths of the plough.

According to the present invention there is provided a semi-mountable plough comprising:

an elongate plough frame having a front portion, a rear portion, and an intermediate portion interconnecting the front and rear portions;

a plurality of plough bodies mounted on the front and rear portions of the plough frame;

a ground wheel supporting said intermediate portion;

adjustment means at the front end of the front frame portion and openable to adjust the said front end laterally in order to vary the ploughing width; and, means for adjusting the mounting of each plough body on its respective frame portion: in which the intermediate frame portion includes a parallelogram linkage having a front connection to the rear end of the front portion and a rear connection to the front end of the rear portion, said linkage being adjustable to, and lockable in different angular positions while maintaining the parallel longitudinal axes of the front and rear frame portions parallel to each other. This invention enables an automatic adjustment in connection with the intermediate frame section carrying the wheel or wheels and, contrary to the prior art technique, the intermediate frame section at all times maintains its position between and interconnection to the front and rear plough frames at all times. The invention may be applied to a reversible plough. The intermediate frame portion comprises two parallel elongated struts each pivotally mounted at each end to front and rear parallel mounting brackets to form a frame in the shape of a parallelogram, said frame being releasably adjustable to any number of angular positions while maintaining the parallel relationship of the fixing brackets. This ensures that equally spaced furrows are cut because the invention adjusts the lateral displacement so that the equal spacing between all the plough bodies is maintained from the front to the rear plough sections.

The intermediate frame portion may be infinitely variably adjustable, thereby allowing the farmer to plough furrows to any width within a specified range of the plough.

The intermediate frame portion may be adjustable in a number of defined steps or angular increments. This feature facilitates the adjustment or readjustment of the plough for a range of common preset ploughing widths.

Figure 2:
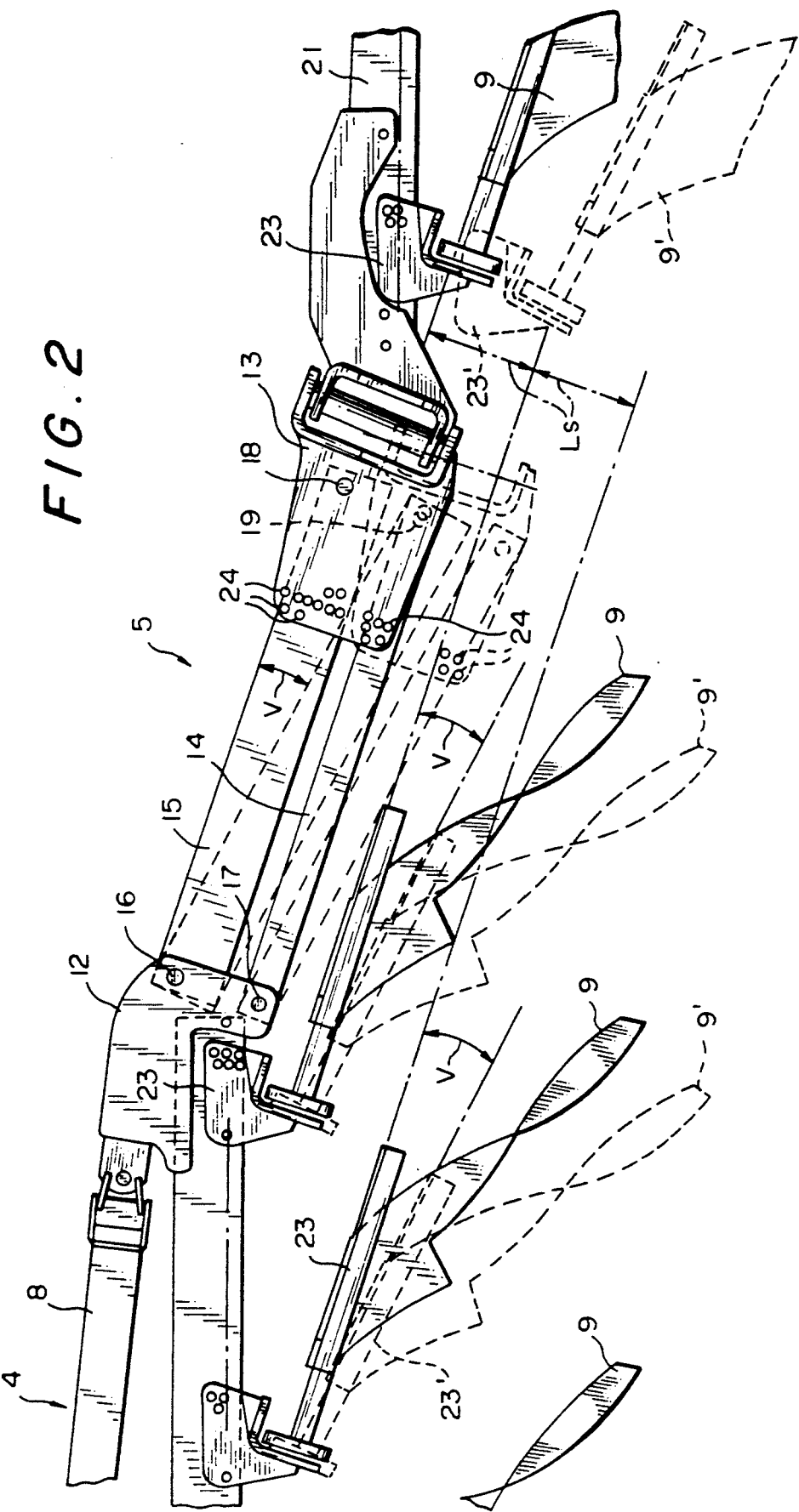

Embodiments of the present invention will now be described, by way of example only, with reference to the accompanying drawings, in which:

FIG. 1 shows a perspective view of a stepwise adjustable semi-mounted reversible plough: and, FIG. 2 shows, on a larger scale, a top plan view of the intermediate frame section of FIG. 1 as well as its interconnection to front and rear plough frames, respectively, with the plough in a reversed position.

The present invention will be described and shown in connection with a stepwise adjustable embodiment of a semi-mounted reversible plough. However, the invention is also applicable with infinitely variable embodiments, for example, with non-stepwise adjustable semi-mounted reversible ploughs of the kind concerned.

FIG. 1 shows a plough according to the present invention in which front pieces 1 are coupled to a tractor or other tractive vehicle, and forms a tractive and pivot point for the rest of the plough.

A reversing mechanism 2 allows adjustment or readjustment of the plough from left hand ploughing to right hand ploughing, and vice versa.

An adjusting mechanism 3 facilitates lateral adjustment of the front end of the front main plough frame 8. The adjusting mechanism may include a slide device, or it may be based on other known principles. The embodiment of this adjusting mechanism is irrelevant, as a number of known and/or conventional mechanisms may be used to achieve the same effect. The adjusting mechanisms have two functions. First, the mechanism has to adapt the plough to tractors with differing track gauges, and second, to effect a lateral displacement in order to adjust the plough into a position corresponding to one of a plurality of possible ploughing widths.

Front plough parts 4 generally comprise the front main plough frame 8 which carries a number of plough bodies 9, and a stabilizing frame 10.

FIG. 2 shows a more detailed view of an intermediate frame section 5 to which the wheel or wheels 11 are connected. The intermediate frame section 5 consists of a front attachment piece 12 to which the front plough parts 4 are attached, and a rear attachment piece 13 to which the rear plough parts 6 are attached.

Front and rear attachment pieces, 12 and 13, respectively, are connected by means of two parallel struts, 14 and 15, of equal length. Each of the struts, 14 and 15, are pivotally supported at either end in the front attachment piece 12 and the rear attachment piece 13. If imaginary lines are drawn between the center of these support or pivot points 16–19, a parallelogram is formed.

The wheels 11 are attached to one of the struts, 14 or 15, by means of wheel carriers 20, so that the plough may be reversed from a right hand ploughing position to a left hand ploughing position, and vice versa. Each wheel carrier 20 is provided with an adjusting mechanism 7 for the lifting or lowering of the plough.

Rear plough parts 6 consist of a rear main plough frame 21 which carries the rest of the plough bodies 9 (the front main plough frame 8 carrying the others). A rearmost combined depth and transport wheel of conventional construction has been omitted from the figures of the drawings for clarity.

When the plough is to be adjusted for a new ploughing width, the following steps take place:

(i) Lateral adjustment of the front end (at 3) of the front main plough frame 8 along the slide 22 of the adjusting mechanism 3 for lateral adjustment. Each lateral adjustment position corresponds to one of a plurality of mutually differing ploughing widths. This operation may be performed by means of, for example, a hydraulic cylinder;

(ii) Adjustment of each single plough body 9, in order to cause them to take a new position. This operation may be effected by moving the carrier 23 (See FIG. 2), through a certain angle in relation to the longitudinal axes of the front and rear main plough frames 8 and 21, respectively. Locking is effected when each single plough body 9 has taken a new position corresponding to one of a plurality of differing ploughing widths. In FIG. 2, plough bodies taking a first position have been denoted 9 and plough bodies taking a second position (broken lines) have been denoted 9'. The angle separating the first and second positions for one plough body has been denoted v (in this particular embodiment, angle v is defined between corresponding first and second positions of a plate-shaped plough body root or attachment piece 23, 23'.) (23 corresponds to the first position and 23' to the second position);

(iii) Displacement of the two struts 14, 15 in relation to each other, so that the angle difference v introduced into the parallelogram 12–19 will be equal to the angular change v of the plough bodies 9, 9' in relation to the longitudinal axes of the front and rear main plough frames 8 and 21, respectively. The parallelogram 12–19 is lockable in each one of a number of angular positions or configurations in relation to the mutually parallel longitudinal axes of the front and rear main plough frames and locking effected in a suitable manner.

In FIG. 2, a stepwise adjustable and locking embodiment of the intermediate frame section has been shown, incorporating a number of corresponding holes 24 for locking bolts to be untightened upon adjustment and retightened once the desired adjusted position has been obtained. However, an infinitely variable adjustment and locking of the articulated parallelogram 12–19 is also possible, for example, through the arrangement of a hydraulic cylinder (not shown) mounted on one of the main frames and attached to one of the parallel struts 14, 15.

In FIG. 2, Ls indicates the equal lateral spacing between adjacent plough bodies 9.

When these adjustments incorporating rotational movements and subsequent locking of movable parts of the plough have been completed, the front main plough frame 8 and the rear main plough frame 21 will still be parallel to each other due to the effect of the parallelogram 16–19 formed by the four members 12, 13 and 14, 15 of the intermediate frame section 5 which carries the wheels 11. The wheels 11 are attached to the intermediate frame section 5 comprising members in the form of front and rear attachment pieces 12 and 13, parallel struts 14 and 15 as well as pivots 16–19. Therefore the wheels 11 will also undergo an angular change v, causing the wheels to guide the plough laterally, so that the wheels 11 again become parallel to the direction of ploughing.

An imaginary line through the intermediate frame section 5 parallel to the furrow edge prior to adjustment or readjustment to a new ploughing width will still be parallel to the furrow edge after adjustment or readjustment has been effected.

The technical effect of the present invention is that, when lateral spacing between adjacent plough bodies is equal for one adjusted ploughing width, the spacing will automatically be correct for all other ploughing widths.

As previously mentioned, the plough shown has been simplified for the sake of clarity to show a stepwise adjustment and a manual operation. However, the invention will function in exactly the same manner with an infinitely variably adjustable plough. In this case the angular change of the parallelogram 16–19 will be performed by means of a suitable remote controlled actuating means, for example a hydraulic cylinder.

The angular change of the parallelogram 16–19 will be transferred to the plough bodies, so that the angular change v for the parallelogram 16–19 and for the plough bodies 9, 9' takes place simultaneously.

A prototype of the plough disclosed has been constructed and built as well as tested with regard to the various functions. This prototype functioned successfully and according to expectations. Indeed, it was a simple task to adjust and readjust the plough according to different ploughing widths without having to exchange any of the parts incorporated.

I claim:

1. A semi-mountable plough comprising:
    an elongate plough frame having a front portion, a rear portion, and an intermediate portion interconnecting the front and rear portions:
        a plurality of plough bodies mounted on the front and rear portions of the plough frame;
        a ground wheel supporting said intermediate portion;
    positioning means at the front end of the front frame portion to adjust the front end laterally in order to vary the ploughing width; and,
    means for adjusting in which the intermediate frame portion includes a parallelogram linkage having a front connection to the rear end of the front portion and a rear connection to the front end of the rear portion, said linkage being adjustable to, and lockable in different angular positions while maintaining the longitudinal axes of the front and rear frame portions parallel to each other.

2. A plough as claimed in claim 1, in which the plough is a reversible plough.

3. A plough as claimed in claim 1, in which the intermediate frame portion comprises two parallel elongated struts each pivotally mounted at each end to front and rear parallel mounting brackets to form a frame in the shape of a parallelogram, said frame being releasably adjustable to any number of angular positions while maintaining the parallel relationship of the fixing brackets.

4. A plough as claimed in claim 1, in which the means for adjusting includes means for retaining the linkage at any position throughout a predetermined angular range.

5. A plough as claimed in claim 1, in which the means for adjusting includes means for retaining the linkage in any one of a finite number of predetermined positions.

* * * * *